RING-SUM LOGIC CIRCUIT

Filed May 27, 1964

INVENTOR.
EDWIN R. KOLB
BY Williams, David, Hoffmann & Yount
ATTORNEYS

United States Patent Office 3,303,464
Patented Feb. 7, 1967

3,303,464
RING-SUM LOGIC CIRCUIT
Edwin R. Kolb, University Heights, Ohio, assignor to Harris-Intertype Corporation, Cleveland, Ohio, a corporation of Delaware
Filed May 27, 1964, Ser. No. 370,493
14 Claims. (Cl. 340—146.2)

The present invention relates to a logic circuit and more particularly to a threshold ring-sum (exclusive OR) circuit and systems embodying such ring-sum circuits.

A ring-sum circuit may be defined as one which has an output when any one or more of an odd number of inputs to the circuit are present. One illustration of such a circuit is a logic circuit for adding three binary digits. Such a stage will have a sum or ring output when one digit is present and will have no output when two digits are present. One technique for providing a ring-sum is to use a logic system embodying AND and OR gates. When this technique is used the number of gates required becomes very large even though a relatively small number of inputs is involved.

While the use of threshold techniques in ring-sum circuits has heretofore been suggested, the particular techniques suggested are difficult to employ particularly for circuits where more than a small number of inputs are involved.

Accordingly an object of the present invention is to provide a new and improved ring-sum circuit which can readily handle more than a very small number of inputs.

Another object of the present invention is to provide a new and improved simplified ring-sum circuit of the threshold-type having an output providing the ring-sum and outputs providing higher order carry signals.

Yet another object of the present invention is to provide a new and improved simplified ring-sum circuit which is adapted to handle more than a small number of inputs and to simplify the circuitry required for a wide variety of logic operations, such as simultaneous addition of a column of numbers, multiplication, combined calculations, parallel parity check, Gray to binary code conversion, coincidence logic, subtraction, etc.

A further object of the present invention is to provide a new and improved simplified logic circuit which uses threshold techniques to provide a ring-sum output and higher order carry outputs and in which a circuit element for producing a carry output also applies a subtractive signal to any lower order elements for producing carry outputs and to the element for producing the ring-sum to effectively subtract a predetermined number of inputs from the circuits for the lower elements.

A still further object of the present invention is to provide a new and improved logic circuit of the exclusive OR type in which a higher order transistor is turned on by the presence of a predetermined even number of inputs to provide a carry output as well as a feedback signal to a lower order transistor, which has been turned on to signal an odd number of inputs, and to subtract from the inputs to the lower order transistor a number corresponding to the even number of inputs necessary to turn on the higher order transistor.

It is also an object of the present invention to provide a new and improved simplified ring-sum circuit in which elements for providing higher order carry signals indicating the presence of a predetermined even number of inputs effect the subtraction of a corresponding number of inputs from a circuit element for indicating the ring-sum digit.

It is further an object of the present invention to provide a new and improved logic circuit which enables a simplified digital to analog circuit to be provided which is adapted to indicate the relative magnitude of two numbers and the difference in magnitudes thereof.

The present invention further provides a new and improved comparison and digital to analog conversion circuit which is adapted to add binary digits representing one number to be compared with the complement of the binary digits of the second number to provide an output signal which has a polarity dependent upon the relative magnitudes of the numbers and a magnitude dependent upon the difference in magnitude of the numbers.

Further objects and advantages of the present invention will be apparent from the following detailed description made with reference to the accompanying drawings, in which.

Figure 1:
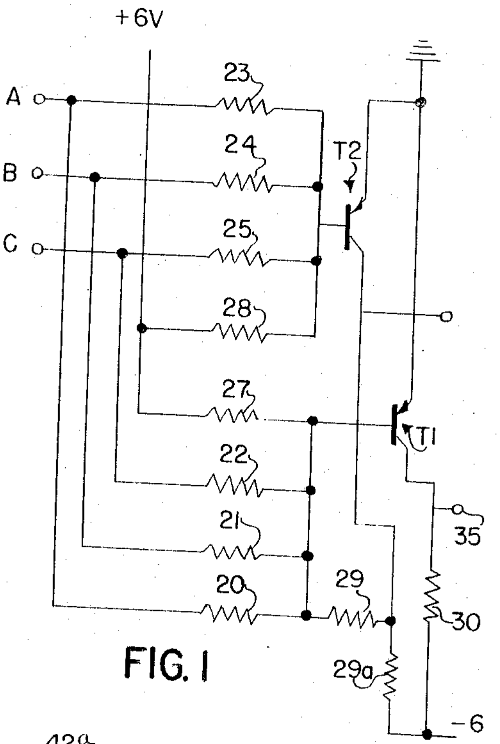
FIG. 1 is an adder stage embodying the present invention.

Referring to FIG. 1 a three input ring-sum (exclusive OR) circuit is shown therein. This circuit may also be termed a threshold logic full adder. As is shown in the drawing, the circuit has three input terminals A, B, C to which input signals indicating the presence or absence of a digit or condition may be applied. While the signal applied may represent digits when arithmetical operations are being performed, it will be well recognized by those skilled in the art that the term "digit" as used in the present application and claims also encompasses the performing of logic operations where a bivalued input signal represents the presence or absence of a particular condition, the presence or absence of which might be arbitrarily represented by the notations 1 and 0, respectively. Consequently, when the term "digit" is used in the present specification, the term in intended to include the broader concept where appropriate.

The input terminals A, B, C are connected to control the conduction of a pair of transistors respectively designated by the reference characters T1, T2. When one or three inputs are present, the transistor T1 is switched on and the transistor T2 is switched off to indicate the negation of this condition.

The input terminals A, B, C are connected to the base of the transistor T1 through respective resistors 20, 21, 22 which are preferably of the same magnitude. The respective terminals are also connected to the base T2 through resistors 23, 24, 25, also preferably of the same magnitude. The bases of the transistors T1, T2 are also connected to the positive side of a power supply, for example, a 12-volt supply having its positive terminal 6 volts above ground and its negative terminal 6 volts below ground, through respective base resistors 27, 28. The resistor 27 may be one-half the resistance of the resistor 20 while the resistor 28 may have the same resistance as the resistor 23. The base of the transistor T1 is also connected to the negative side of the power supply through a resistor 29 which is of the same magnitude as the resistor 27 to thereby establish a quiescent current which causes the base of the transistor to be at approximately ground potential and preferably slightly above ground by reason of a relatively small resistor 29*a* between the resistor 29 and the negative side of the power supply.

The emitter of the transistor T1 is connected to ground and the collector is connected to the negative side of the power supply through a resistor 30. Similarly, the emitter of transistor T2 is connected to ground and the collector is connected to the negative side of the power supply through the resistor 29*a*. The collector of the transistor T2 and the base of transistor T1 are, however, interconnected through the resistor 29*a*.

The presence of an input or the digit (1) at any one of the terminals A, B, C is, in the illustrated circuit, indicated by applying a negative potential thereto, −6 volts, and the absence of the condition or the digit (0) is signified by applying a substantially ground potential to the terminal. The resistors 20, 21, 22 are such that if any one of the terminals A, B, C has an input applied thereto, the transistor T1 will be conductive by reason of the fact that the current flow from the positive terminal through the resistor 27 and through the resistor 20, 21, or 22, depending upon the terminal to which the input is applied, causes the base of the transistor T1 to go sufficiently below ground, the potential of the emitter, to establish a base current of sufficient magnitude to switch the transistor on and provide an output signal at a terminal 35 which is connected to the collector of the transistor T1. When the transistor T1 is turned on, the voltage of the collector will become more positive and will approach that of ground from its potential of about −6 volts when transistor T1 is off. Thus the presence of a potential of approximately ground at the terminal 25 signifies the presence of at least one input.

The transistor T2, which has its emitter connected to ground and its collector connected to the negative side of the power supply through the resistor 29*a*, is not rendered conductive by a single input at the terminals A, B or C; but it is rendered conductive when two or more inputs are present at the terminals A, B, C. This may be accomplished by making the resistors 23, 24, 25 and 28 substantially equal and such that under quiescent conditions, the base of transistor T2 will be sufficiently above ground to require two inputs to establish a current magnitude through the resistor 28 to pull the base sufficiently below ground to switch the transistor on.

When the transistor T2 is conductive, its collector becomes more positive and has a potential thereon approximately equal to ground to indicate the presence of two or more inputs at the terminals A, B, C. However, the collector of the transistor T2 is also connected to the base of the transistor T1 through the resistor 29. When the collector T2 goes positive, the current flowing from the positive side of the power supply through the resistor 29 to the base terminal of the transistor T1 is reduced since the potential on the negative side of the resistor 29 has been changed from approximately minus 6 volts to approximately ground. This reduction in current raises the potential of the base T1 an amount which effectively subtracts the base current provided by two inputs at the terminals A, B, C. Consequently all three inputs will have to be present before the transistor T1 is turned on.

The voltage appearing at the terminal 35 indicates the ring-sum while the voltage appearing at a terminal 36 connected to the collector T2 will indicate a carry output. In view of the fact that the convention adopted for the inputs called for an input, when present, i.e., the digit (1), to be represented as a negative voltage and when absent, i.e., the digit (0), by a voltage approximately at ground, the output voltages on the terminals 35, 36 will be NOT functions of the inputs since the more positive voltage will be present when the ring-sum and carry outputs are non-zero or (1) and the more negative voltage will be present when the ring-sum and carry outputs are absent or (0).

Figure 2:
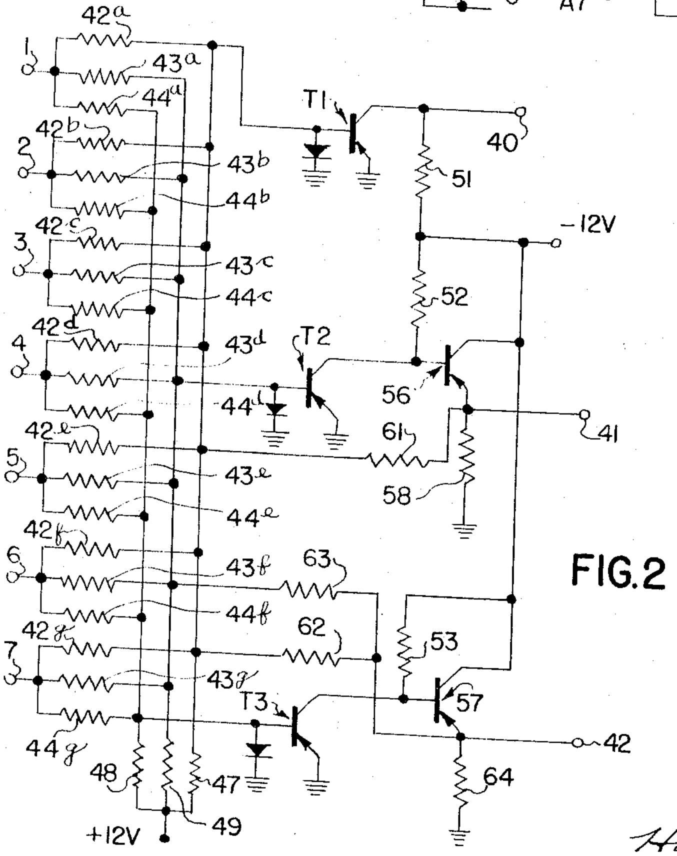
FIG. 2 is a seven input ring-sum circuit embodying the present invention.

The basic threshold logic circuit shown in FIG. 1 may be readily expanded to provide a ring-sum circuit having a larger number of inputs. In FIG. 2, a seven-input ring-sum circuit embodying the present invention is shown. As shown therein, the circuit has seven input terminals designated by the reference numerals 1, 2, 3, 4, 5, 6, 7, respectively. The input terminals control the switching of three transistors, T1, T2 and T3. The output of the transistor T1 appearing at a terminal 40 represents the ring-sum output, while the outputs of the transistors T2, T3 appearing respectively on output terminals 41, 42 indicate first order and second order carries respectively.

The input terminals 1–7 are each connected to the bases of the transistors T1, T2, T3 through respective input resistors. The input resistors connecting the respective terminals to the base of transistor T1 have been given the reference numeral 43, the input resistors connecting the respective terminals to the base of transistor T2 have been given the reference numeral 44, while the input resistors connecting the respective terminals to the base of the transistor T3 have been given the reference numeral 45, each with a letter appended thereto corresponding to the respective terminal. The bases of the transistors T1, T2 and T3 are also connected to the positive side of the power supply through respective base resistors 47, 48, 49. The resistors 47, 48, 49 are so related to the input resistors that the presence of any one input at the terminals 1–7 will cause the transistor T1 to turn on, the presence of any two inputs at the terminals 1–7 will cause the transistor T2 to turn on and the presence of any four inputs at the terminals 1–7 will cause the transistor T3 to turn on. The non-zero outputs to the terminals may be −12 volts and the zero inputs substantially ground.

In the circuit of FIG. 2, the collectors of the transistors T1, T2, T3 are connected to the negative side of the power supply through respective resistors 51, 52, 53. In the case of the transistors T2, T3, the collectors are also connected to control transistors 56, 57. The base of the transistor 56 is connected to the collector of T2 while the emitter is connected to ground through an emitter resistor 58 and the collector is connected directly to the negative side of the power supply. The transistor 56 is an emitter follower and will be conductive when the transistor T2 is non-conductive. When transistor T2 is non-conductive, its collector and in turn the base of the transistor 56 will be at a potential negative with respect to ground, thus rendering the transistor 56 conductive. The base current for rendering the transistor 56 conductive flows from the base of the transistor to the negative side of the power supply through resistor 52, the emitter of the transistor being connected to ground through the resistor 58 and to the positive side of the power supply through a resistor 61 connected between the emitter and the negative side of the resistor 47 (the potential of which establishes the potential of the base of transistor T1). This bias, however, does not cause transistor T1 to turn on when the inputs are all zero. The forward bias applied by the transistor 56 to the base of transistor T1 is removed when the transistor T2 is switched on in response to two non-zero inputs at any of the input terminals 1–7. When the transistor T2 is switched on its collector goes to substantially ground potential to switch off transistor 56 and to make the bias potential more positive and effect a subtraction from the forward bias for the transistor T1 which is the equivalent of the bias provided by two non-zero inputs to the terminals 1–7. Consequently, if only two non-zero inputs are present, the transistor T1 switches off to negate the presence of an odd number of inputs. A third non-zero input will, however, effect the switching of the transistor T1 back on.

In a manner similar to the connections described for transistors T2 and 56, the transistor 57 is connected with transistor T3 as an emitter follower. The base of the transistor 57 is connected to the collector of the transistor T3 and the emitter of the transistor 57 is connected by a resistor 62 to the base of transistor T1 and by a resistor 63 to the base of transistor T2. The emitter of transistor T3 is also connected to power supply by the resistors 62 and 63 which have their ends remote from the emitter connected to the positive side of the power supply through the resistors 47, 48, respectively. Also a resistor 64 connects the emitter of transistor 57 directly to ground. When the transistor T3 is non-conductive the transistor 57 will be conductive, since the base thereof will be at a negative potential as compared to the emitter in a manner corresponding to that described for transistor 57. With the transistor 57 conductive, current is drawn through both the resistors 47, 48 and through resistors 62, 63 to establish biasing potentials for the bases of the transistors T1, T2 which correspond respectively to the forward bias provided by applying four inputs to the terminals. When any four inputs at the terminals 1–7 render the transistor T3 conductive, the transistor 57 will be cut off since the base thereof will assume a potential of approximately ground. This will cause the emitter voltage to become more positive and the forward biasing current for transistors T1 and T2 through the resistors 47, 48 to be reduced by the current drawn by the transistor 57 through these resistors. This will increase the number of inputs which must be present to make the transistors T1, T2 conductive. The reduction in current through the resistors 47, 48 is such that four additional inputs must be present before the transistors T1, T2 will conduct. Consequently the effect of rendering the transistor T3 conductive is that of effectively subtracting four inputs from the terminals 1–7 insofar as the transistors T1 and T2 are concerned.

The following table indicates the conditions present in the circuit depending upon the number of non-zero inputs.

| No. of Non-Zero Inputs (Mode) | Feed-back from $T_2$ | Feed-back from $T_3$ | $T_1$ | | Feed-back from $T_2$ | $T_2$ | | $T_3$ | |
|---|---|---|---|---|---|---|---|---|---|
| | | | Non-Zero Inputs $T_1$ | State of $T_1$ | | Non-Zero Inputs $T_2$ | State of $T_2$ | Non-Zero Inputs $T_3$ | State of $T_3$ |
| 0 | 0 | 0 | 0 | Off | 0 | 0 | Off | 0 | Off. |
| 1 | 0 | 0 | 1 | On | 0 | 1 | Off | 1 | Off. |
| 2 | −2 | 0 | 0 | Off | 0 | 2 | On | 2 | Off. |
| 3 | −2 | 0 | 1 | On | 0 | 3 | On | 3 | Off. |
| 4 | 0 | −4 | 0 | Off | −4 | 0 | Off | 4 | On. |
| 5 | 0 | −4 | 1 | On | −4 | 1 | Off | 5 | On. |
| 6 | −2 | −4 | 0 | Off | −4 | 2 | On | 6 | On. |
| 7 | −2 | −4 | 1 | On | −4 | 3 | On | 7 | On. |

It can readily be seen then that the threshold logic circuit of FIG. 2 can readily be expanded by adding a fourth transistor T4, etc. In any expansion of the circuit there will be $n$ transistors for a circuit adapted to handle $2^n-1$ inputs. The transistors will each represent one number of the progression $2^0, 2^1, 2^2 \ldots 2^n$ with the higher order transistors providing feedback to the lower order transistors to in effect increase the number of inputs necessary to render the lower order transistors conductive by a number corresponding to the number in the progression for the term to which the transistor corresponds.

The ring-sum circuit of FIG. 2 is particularly adapted to perform multi-input (columnar) binary addition. In performing multi-input (columnar) binary addition, the following rules are followed:

(1) When adding to obtain the least significant digit sum, $S_0$, there are no incoming carries.

(2) The second least significant digit sum, $S_1$, is the sum of the addend digits plus $Co$ the first carry from the first sum.

(3) The third least significant digit sum, $S_2$, is the sum of those addend digits, plus the first carry from $S_1$, i.e., $Co$ and the second carry from $S_0$.

The circuit of FIG. 2 is, in accordance with the above rule, adapted to handle a column of digits of five multi-digit numbers to be added where each column has five digits and the third significant column and those of higher significance require two carry inputs. The five binary digits of a column are applied to five of the inputs of the ring-sum circuit for adding the column and first and second order carries from the addition of columns of lower significance are applied to the other two inputs of the ring-sum circuit.

Similarly it can be shown that multiplication of a five-digit number by a five-digit multiplier will result in addition to determine the respective digits of the figure requiring at the most the summing of five digits plus two carry digits in one column. The disclosed circuit is particularly useful in carrying out such multiplication. Those skilled in the art will readily recognize that the operation performed by the circuit can also be used to determine binary coincidence, etc.

Figure 3:
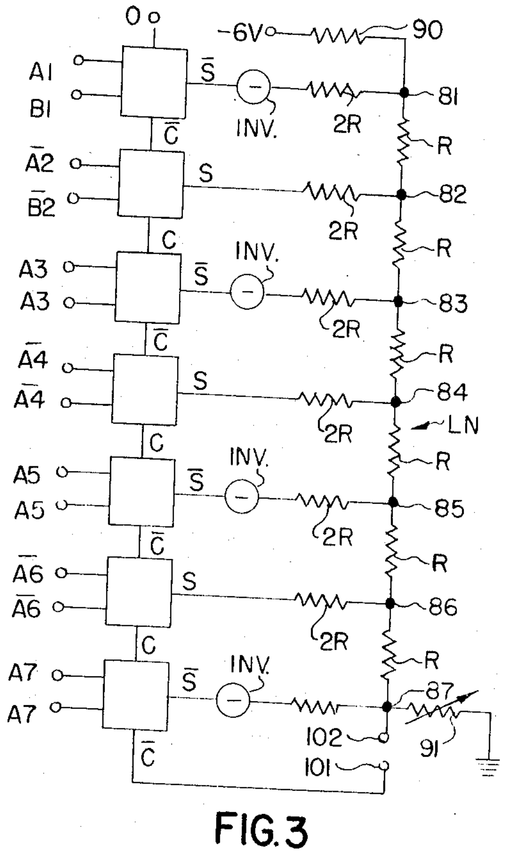
FIG. 3 is an adder circuit and digital to analog decoder embodying the present invention.

A comparator in the form of a full parallel adder circuit and a digital to analog converter circuit for converting the sum to an analog output is shown in FIG. 3. The circuit of FIG. 3 may be particularly useful in comparing numbers to determine the relative magnitude of the same and to provide an output which is the difference of the two numbers. In effect, two numbers may be subtracted in binary addition by complementing the minuend and adding the digits of the complemented number to the subtrahend.

For example, if we wish to perform the subtraction $$(+M)-(+R)$$

where M is the minuend and R is the sutrahend, we complement the digits of the minuend and add the resulting number to the subtrahend and the resulting answer must be treated as follows: If there is no overflow carry, the answer must be complemented and the resulting number is positive and it is the magnitude of the difference. If there is an overflow carry, the result is negative and the result plus 1 is the difference.

In FIG. 3, the various stages of the full parallel adder are indicated in block form and each stage may essentially comprise the circuit shown in FIG. 1. Each stage of the adder is shown as having an input A and an input B with a number indicating the stage and all stages except the first have a C input representing a carry from the preceding stage. The first stage has the least significant digits A1, B1 applied thereto. The second stage has the next least significant digits A2, B2 applied thereto, etc. It will be remembered that the A digits are the complement of the number actually being compared with the number B. Also, as explained in connection with FIG. 1, the outputs of each stage on the carry terminal and the sum terminal are normally NOT functions of the input. The preferred circuit utiilzes the NOT carry functions directly so that alternate stages of the adder will have output stages which are NOT functions and the other stages will have outputs which indicate the presence of the function. To accomplish this the inputs to the stages which have NOT carries applied thereto are inverted so as to be NOT functions. This direct use of the NOT functions is possible since an inherent characteristic of the circuit of FIG. 1 is that $$V_s=\overline{A\oplus B\oplus C}=\bar{A}\oplus\bar{B}\oplus\bar{C}$$

$$V_c=\overline{AB+BC+CA}=\overline{AB}+\overline{BC}+\overline{CA}$$

and $$C_{i+1}=A_iB_i+B_iC_i+C_iA_i$$

$$\bar{C}_{i+1}=\bar{A}_i\bar{B}_i+\bar{B}_i\bar{C}_i+\bar{C}_i\bar{A}_i$$

where $V_s$ and $V_c$ are the voltage levels corresponding to the digit (1)

The sum outputs from the adder stages are connected to a resistive type ladder network LN which is connected at its least significant end to a potential indicated as negative and at its higher order end to a potential indicated as ground. Those outputs which are NOT functions are connected to the ladder through an inverter INV. The resistive network has a plurality of terminals connected in series by equal resistances R to which the sum outputs are connected through load resistors twice the size of R and designated 2R, the terminals being designated by the reference numerals 81, 82, 83, 84, 85, 86, 87. The least significant digit terminal 81 is connected to the negative side of the power supply through a resistor 90 which may be about twice the magnitude of the resistors between the terminals while the most significant digit terminal 87 is connected to ground through a variable resistor 91. The resistance of resistors 90 may each be about twice that of the resistors between the terminals, while the resistor 91 is for matching purposes and is selected to effect the proper matching. The resistor 91 is not required as far as the basic operation of the current is concerned.

In addition, the carry output from the most significant stage, which is indicated as being a NOT output, is connected by a connection 100 to the terminal 87. The connection 100 has output terminals 101, 102 therein for providing an analog output between the potential of terminal 87 and the potential of the carry output for the last stage. The output of the carry connection will switch between a voltage level which is substantially ground when the carry is present and about −6 volts when the carry is absent. Consequently, until a carry is signaled, the output of the carry connection and the potential of terminal 101 will be about −6 volts relative to ground. The voltage drop across the terminals 101, 102 will depend upon the loading through the resistance ladder and internally through the networks produced by the potentials appearing on the sum digit output connections of the stages. When all of the digit outputs are at substantially ground indicating a sum digit of zero, the loading of the ladder network due to current drawn from the terminal 101 will be at a maximum and the analog output across the terminals will be at a maximum. As the digit output terminals switch from (0) to (1), −6 volts, the voltage across the terminals 101, 102 will change due to current drawn through the ladder network because of the presence of the digit output (−6 volts) on one or more of the digit output connections. The loading due each digit output at −6 volts will be a function of the resistance between the digit output connection and the output terminal 102. Clearly this current will be a function of the weight of the digit in the case of the ladder network described.

In view of the fact that, in the absence of a carry, the carry connection of the most significant stage and the terminal 101 are at −6 volts and the ladder network is terminated at its least significant end by returning the least significant terminal to −6 volts, the ladder network functions in the manner of a conventional ladder network of this type to provide an analog output of the sum represented by the digits on the sum output connections. However, as mentioned above, if the sum represented by the digits is zero, the voltage output is at a maximum and as the sum becomes larger, the voltage output decreases since the presence of a (1) output at one or more of the digit connections causes the potential on the output to be at −6 volts. This is the same potential as the carry connection and does not draw current through the ladder network and therefore reduces the voltage drop across terminals 101, 102. Since the voltage output at terminals 101, 102 decreases as the sum increases, the output voltage at terminals 101, 102 is the complement of the sum number appearing on the sum digit output connections.

When an overflow carry occurs in the most significant stage, the carry connection of the most significant stage, which is connected to the terminal 101, switches to approximately ground potential. This means that the digit connections will now load the ladder network when the output connections are at −6, that is, when the output connections have the digit (1) thereon. The voltage representing a (1) on the digit output connections will load the ladder network in accordance with the weight of the digit and the voltage will vary as a direct function of the sum since the current in the ladder will increase as the number of digit outputs having a (1) thereon increases. The output voltage from the ladder is of opposite polarity than when there was no overflow carry since the terminal 101 is now positive with respect to the terminal 102. Moreover, since the terminal 101 is positive with respect to the potential to which the least significant end of the ladder network is returned through the resistor 90, the resistor 90 in effect adds a (1) to the output voltage. Consequently the ladder network now functions to provide a number which according to the rule expressed above is a negative number and a (1) has been effectively added to this number. It can now be seen that the full parallel ladder and the ladder network will function in accordance with the rules of subtraction expressed above and the full parallel adder and ladder network will function to indicate the relative magnitude of two numbers and to indicate the difference in magnitude thereof. While the ladder network of the type shown is a conventional type network and has conventionally been connected to parallel adder outputs to provide an analog conversion of the sum output, the use of the carry connection of the most significant stage to switch the reference potential for the network and the returning of the least significant end to a potential which effectively adds a (1) to the output as well as the overall arrangement in combination with the adder stages which enables the network to indicate the relative magnitude and difference in magnitude of two numbers is believed to be novel.

One advantage of using the type of adder stage shown in FIG. 1 in the circuit of FIG. 3 and of using the NOT outputs from a stage as the direct inputs to the succeeding stage is that a minimum carry time can be obtained since the carry passes through only one transistor in each stage. While this requires the complementing of alternate sum digits, these sum digits can be followed by an inverter without adding time to the carry propagation function. Since each carry propagation time for an N bit parallel adder will be N times the switching time of a single transistor, the technique herein described will be as fast as a unit time adder, particularly when the technique is limited to handling five bits in parallel. While the switching time might be somewhat greater for a larger number of bits, the system is much less complicated than any other known schemes.

The use of the above circuitry also provides a simplification in that the sum transistor or its inverter of each stage can be used to drive the ladder type network because the transistor or the inverter is completely unloaded in the threshold logic circuit.

It can now be seen that the present invention provides a new and simplified ring-sum logic circuit which includes threshold devices, one of whose condition is switched in response to a predetermined number of inputs, and a second one whose condition is switched in response to a larger predetermined number of inputs to provide the carry output and a feedback to the first device to effectively subtract the second larger predetermined number of inputs from the inputs to the first device. Moreover, the circuit has been embodied in a new and improved full parallel adder which may be used in a novel combination with a known type of ladder network to provide an output voltage whose polarity indicates the relative magnitude of two numbers, and the magnitude of the difference of the two numbers. This latter is accomplished by complementing the minuend of the two numbers to be subtracted and applying the digits of the complemented minuend and the digits of the subtrahend to the various stages of the adder circuit.

Although the present invention has been described in considerable detail, it is hereby my intention to cover further arrangements, modifications and constructions which fall within the ability of those skilled in the art and within the scope and spirit of the present invention.

What I claim is:

1. A logic circuit including a first threshold device providing an output in response to an input control signal of a predetermined magnitude, input circuit means including a plurality of input connections and means for summing the inputs on said connection connected to the input of said threshold device to provide said control signal in response to the presence of at least a predetermined number of inputs on said connections, a second threshold device providing an output in response to an input control signal of a predetermined magnitude, input circuit means for said second device connected to said input connections for summing said inputs and for providing said input control signal for said second threshold device in response to the presence of a second predetermined number of inputs on said input connections, and circuit means responsive to an output from said second device for applying an input signal to the input circuit for the first threshold device to change the magnitude of said control signal for said first device by an amount corresponding to said second predetermined number to increase the number of inputs on said input connections necessary to provide said output from said first threshold device.

2. A ring-sum circuit for determining the ring-sum of electrical input on three input connections, said inputs having conditions designated 0 and 1, respectively, said circuit comprising first input circuit means for summing the (1) inputs and providing a control signal having a magnitude dependent upon the number of (1) inputs present, a threshold device responsive to said signal and actuated to provide an output when at least two of said (1) inputs are present, additional input circuit means for summing said (1) inputs and a subtractive signal controlled by said threshold device and providing an output control signal having a magnitude dependent on the sum of said (1) inputs and said subtractive signal, circuit means connecting said signal from said threshold device to said additional input circuit means to effectively subtract two (1) inputs from the number of inputs summed by said additional input circuit means when said threshold device is actuated whereby said subtractive signal reduces the sum of the inputs to said additional circuit by two, and an additional threshold device responsive to the output control signal from said additional circuit means to provide an output in response to said output control signal from said additional input circuit means which corresponds to a sum indicating the presence of an odd number of (1) inputs on said connections.

3. A ring-sum circuit as defined in claim 2 wherein said threshold devices are transistors and said input circuit means and said additional circuit means are connected to the bases of said transistors to provide a bias on said transistors, said additional circuit means providing a forward bias on said additional threshold device which is removed in response to the output from the first-mentioned threshold device.

4. A ring-sum circuit for indicating the ring-sum of three inputs represented by bilevel input signals, input circuit means for summing said input signals and providing an output signal in accordance with the number of input signals having a predetermined level, a transistor having its input connected to the output of said circuit means and turned on in response to a voltage from said circuit means corresponding to at least two of said signals having said predetermined level, a second transistor, circuit means for turning on said second transistor in response to the presence of two of said signals having said predetermined level, and control means responsive to the turning on of said second transistor for turning off said first transistor, said control means biasing said first transistor to turn on in response to three or more inputs of said predetermined level when said second transistor is conductive.

5. A ring-sum circuit as defined in claim 4 wherein said control means comprises a bias circuit for forward biasing said first transistor when said second transistor is not conductive and for reducing forward bias on said first transistor when said second transistor is conductive.

6. A ring-sum circuit for determining the ring sum of $2^n-1$ binary inputs representing conditions of (0) and (1) with the signals having a predetermined electrical magnitude when the signal is 1, $n$ transistors which represent a respective number in the progression $2^0, 2^1, 2^2, 2^3 \ldots 2^n$, circuit means connecting said binary inputs to the inputs of each of said transistors to turn on the respective transistors when a number of (1) inputs is present corresponding to the number in the progression represented by the transistor and circuit means responsive to the output of each of the higher order transistors and connected to the input of each of the transistors of lower order for increasing the number of inputs necessary to turn on the lower order transistor by the number of inputs in said progression for effecting the turning on of the higher order transistor.

7. A ring-sum circuit as defined in claim 6 wherein said higher order transistors each have an output terminal providing a higher order carry signal.

8. A ring-sum circuit as defined in claim 6 in which said circuit means for applying said inputs to said transistors effects an increase in the forward bias for each (1) input present and said circuit means responsive to the output of each of the higher order transistors applies a forward bias to each lower order transistor corresponding to the bias supplied by the number represented by the higher order transistor in said progression when the higher order transistor is non-conductive and removes the forward bias when the higher order transistor is conductive.

9. A ring-sum circuit for determining the ring-sum of $2^n-1$ binary inputs representing conditions of (0) and (1) with the signals having a predetermined electrical magnitude when the signal is (1), $n$ threshold devices which represent a respective number in the progression $2^0, 2^1, 2^2, 2^3 \ldots 2^n$, circuit means for summing said (1) inputs to provide a control signal having a magnitude which is a function of said (1) inputs, means connecting said circuit means to said threshold devices to actuate said devices to provide a (1) output signal when a number of (1) inputs is present corresponding to the number in the progression represented by the threshold device and circuit means responsive to the presence of a number of (1) inputs corresponding to any of the numbers in said progression and connected to the input of each of said devices corresponding to the lower order numbers of the progression for increasing the number of (1) inputs necessary to actuate the lower order threshold devices by the number of (1) inputs to which the circuit means is responsive.

10. A ring-sum circuit as defined in claim 9 wherein each of the higher order threshold devices has an output terminal providing a higher order carry signal.

11. A comparator including a digital to analog conversion circuit comprising an adder circuit having a plurality of adder stages for adding the corresponding digits of a pair of binary numbers, the digits of equal significance in each of said binary numbers being applied to a corresponding stage of the adder and the stages of said adder having carry output connections, said carry output connections of each stage below the most significant stage being connected to the next more significant stage of the adder, said stages each having ring-sum output connections, a resistance ladder network having a plurality of terminals each connected to a respective one of said sum output connections to provide a current in the ladder corresponding to the weight of the digit when a ring-sum output appears on the ring-sum output connection, a connection connecting the most significant terminal of said ladder network to the most significant carry connection of said adder and inclding voltage output terminals across which a device is to be connected to measure the output voltage of said ladder network, a terminating resistor returning the least significant terminal of said ladder network to a potential corresponding to the potential of said most significant carry connection when a carry is absent on the carry connection whereby the presence of a carry on said carry connection causes said terminating resistor to add a (1) to said ladder network.

12. A comparator and binary digit converter as defined in claim 11 wherein each of said stages more significant than another stage comprises input circuit means for summing the digit inputs and the carry input to the stage and providing an input control signal, a first threshold device responsive to said input control signal and actuated to a predetermined condition in response to the presence of at least one of said digit and carry inputs to provide the ring-sum output, a second threshold device, second input circuit means for summing said digit inputs and said carry input and providing an input control signal having a magnitude dependent upon the number of inputs, means connecting said second input circuit means to said second threshold device to actuate said second threshold device to a predetermined condition in response to an input signal indicating two or more inputs to the stage to provide a carry output, and circuit means controlled by said second threshold device and operative when said second threshold device is actuated to its said predetermined condition to inhibit said first threshold device from being actuated until at least three of said inputs are present, the least significant stage of said adder corresponding to the other stages but having no carry input.

13. A comparator and digital to analog converting circuit as defined in claim 12 wherein said threshold devices are transistors and said input circuit means comprise circuit means connected to the bases of said transistors for applying a forward bias thereto.

14. A comparator including a digital to analog conversion circuit comprising an adder circuit having a plurality of adder stages for adding the corresponding digits of a pair of binary numbers, the digits of equal significance in each of said binary numbers being applied to a corresponding stage of the adder and the stages of said adder having carry output connections upon which a (1) or a (0) output appears, said carry output connections of each stage below the most significant stage being connected to the next more significant stage of the adder, said stages each having ring-sum output connections upon which a (1) or (0) output appears, a resistance ladder network having a plurality of terminals each connected to a respective one of said sum output connections to provide a current in the ladder corresponding to the weight of the digit when a ring-sum output appears on the ring-sum output connection, a connection connecting the most significant terminal of said ladder network to the most significant carry connection of said adder circuit and including output terminals across which a device is to be connected to measure the output of said ladder network, a terminating resistor returning the least significant terminal of said ladder network to a potential corresponding to the potential of said most significant carry connection when a carry is absent on the carry connection whereby the presence of a carry on said carry connection causes said terminating resistor to add a (1) to said ladder network, the potentials on said ring-sum outputs and said most significant carry connection being the same for the (1) and (0) outputs respectively with the potential for the (1) outputs being below that for the (0) outputs.

References Cited by the Examiner

UNITED STATES PATENTS

| | | | |
|---|---|---|---|
| 2,923,475 | 2/1960 | Ketchledge | 235—175 |
| 2,954,551 | 9/1960 | Doucette et al. | 340—347 |
| 2,999,637 | 9/1961 | Curry | 235—175 |
| 3,094,613 | 6/1963 | Miller | 235—176 |
| 3,113,206 | 12/1963 | Harel | 235—176 |
| 3,148,274 | 9/1964 | Davis | 235—172 |
| 3,218,483 | 11/1965 | Claper | 307—88.5 |

MALCOLM A. MORRISON, *Primary Examiner.*

M. SPIVAK, *Assistant Examiner.*